Sept. 26, 1933.  A. L. VARGHA  1,928,119
VIBRATION DAMPENER
Filed Aug. 20, 1931   2 Sheets-Sheet 1

Inventor
Andrew Louis Vargha
By Blackmore, Spencer & Flinn
Attorney

Sept. 26, 1933.          A. L. VARGHA                1,928,119
                       VIBRATION DAMPENER
                     Filed Aug. 20, 1931         2 Sheets-Sheet 2
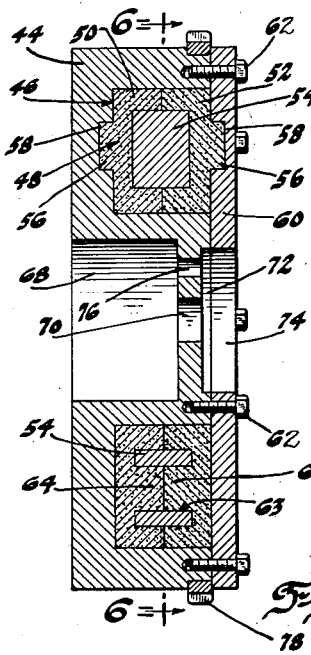
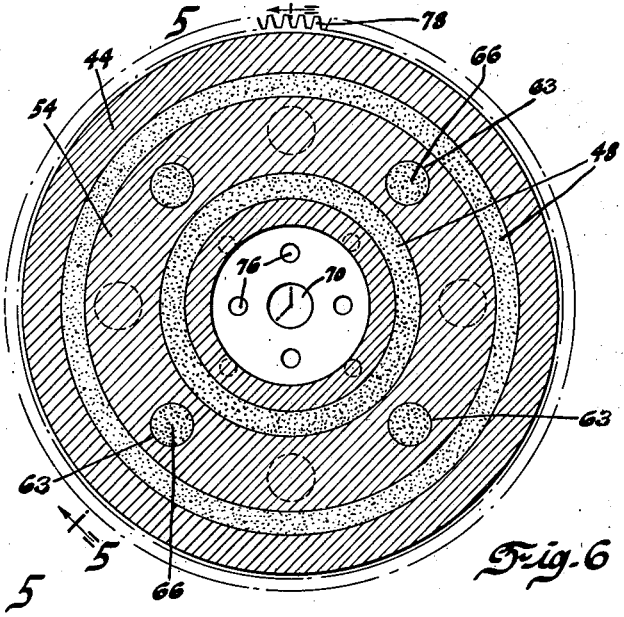
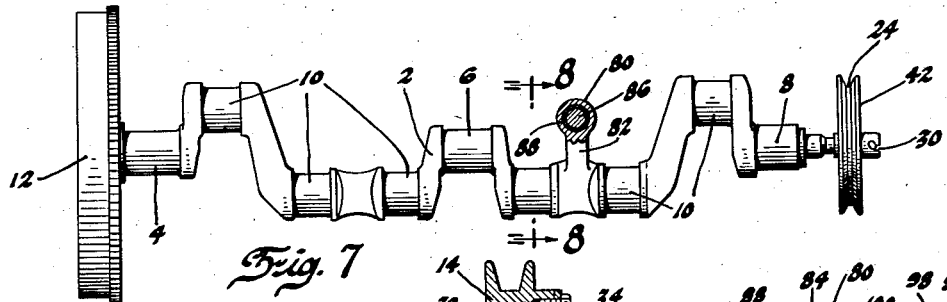
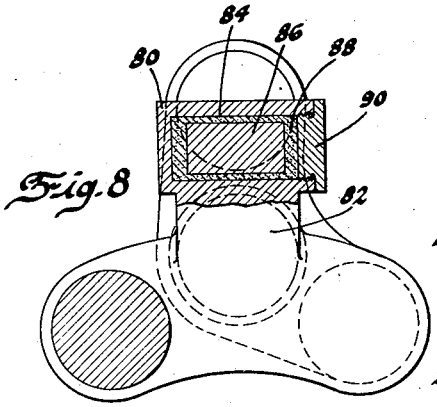
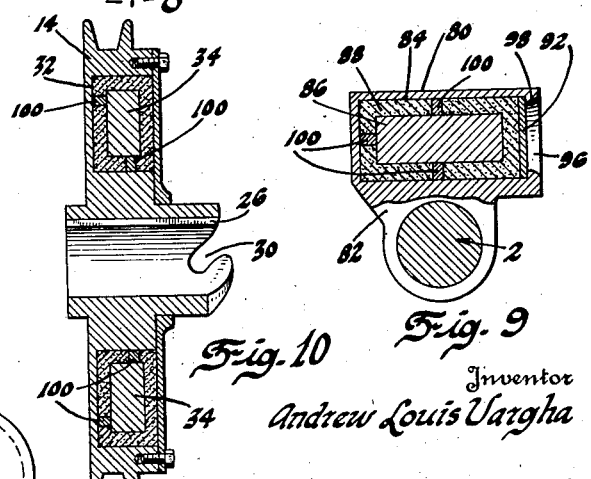
Inventor
Andrew Louis Vargha Patented Sept. 26, 1933

1,928,119

UNITED STATES PATENT OFFICE 1,928,119

VIBRATION DAMPENER

Andrew Louis Vargha, Detroit, Mich., assignor to General Motors Corporation, Detroit, Mich., a corporation of Delaware Application August 20, 1931. Serial No. 558,222

6 Claims. (Cl. 74—6)

This invention relates to vibration dampening or balancing devices and has particular reference to a dampener or balancer to be applied to the crankshafts of internal combustion engines of automotive vehicles.

The purpose of the device of the invention is to dampen the vibrations in the crankshaft and to give a smoother running to the engine. The particular novelty of the invention resides in confining a ring in a floating mass of rubber. The balancing effect is obtained by the internal friction in the rubber.

In the specific embodiments of the invention, either the flywheel at the rear of the crankshaft or the belt pulley at the front of the crankshaft is constructed hollow to receive a dampening mass in the form of a metal ring with the space between the ring and the hollow portion of the wheel filled with rubber. A plate fits over the hollow portion of the wheel to confine the rubber and dampening ring in the wheel. The rubber may be vulcanized to both the ring and the wheel or it may be molded separately in two parts and assembled with the ring in the hollow portion of the wheel.

On the drawings:

Figure 5 is a section similar to Figure 2 through a modification of the dampener as applied to the flywheel, taken on the line 5—5 of Figure 6.

Figure 6 is a section on the line 6—6 of Figure 5.

Figure 7 is a view of a crankshaft showing the application of a modified form of dampener.

Figure 8 is a section on the line 8—8 of Figure 7 with the dampener shown in section.

Figure 9 is a sectional view through a modified form of dampener similar to Figure 8.

Figure 10 is a section through a modified form of dampener similar to Figure 1.

Figure 1:
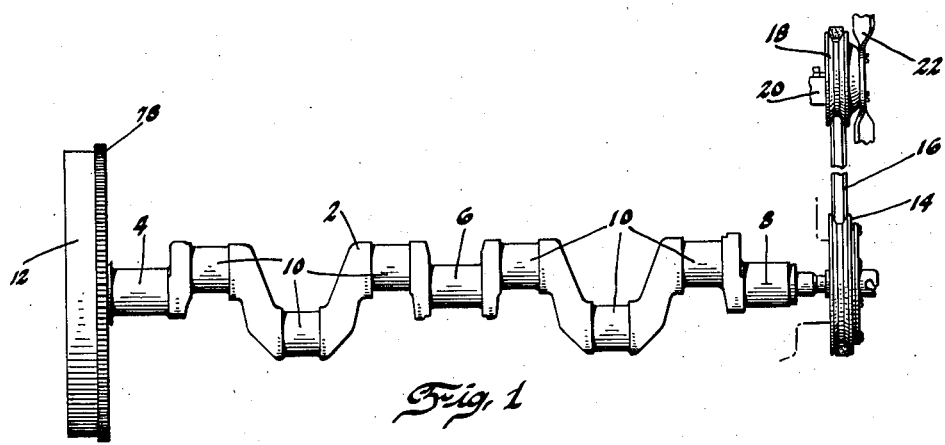
Figure 1 is a side view of the crankshaft of an internal combustion engine showing the invention applied to the belt pulley at the front of the crankshaft.

Referring to the drawings, the numeral 2 indicates the multithrow crankshaft used on internal combustion engines. The crankshaft has the bearing portions 4, 6 and 8 by means of which it is mounted in the crankcase and the crankthrow bearing portions 10 to which the connecting rods are joined. The crankshaft has the flywheel 12 at one end and the belt pulley wheel 14 at its forward end. A belt 16 travels in a groove in the pulley 14 and runs over a pulley 18 mounted on a shaft in a bearing 20 to operate the fan 22.

Figure 2:
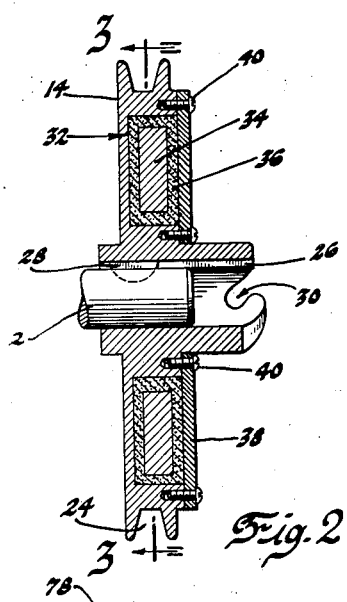
Figure 2 is a section through the balancer in the plane of the crankshaft, on the line 2—2 of Figure 3.
Figure 3:
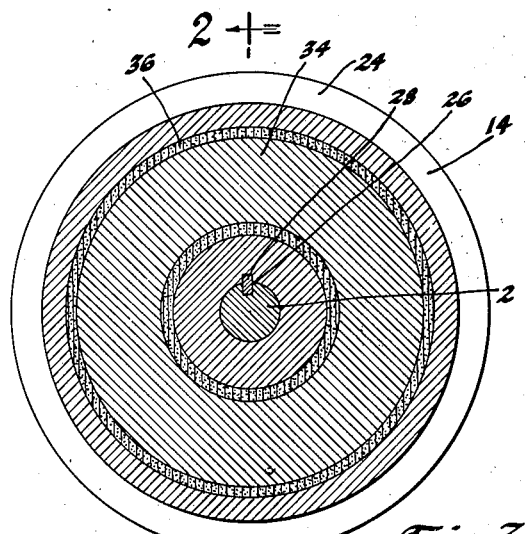
Figure 3 is a section on the line 3—3 of Figure 2.

The belt pulley 14 is shown in section in Figures 2 and 3. The wheel has the groove 24 for the reception of the belt 16 and the keyway 26 at its mid portion for the reception of the key 28 by means of which it is rigidly mounted on the crankshaft 2. A bayonet slot is shown at 30 for the reception of a starting crank.

The pulley wheel 14 is hollow as indicated at 32 and in the hollow portion there is received the dampening mass or metal ring 34 and the dampening rubber mass 36. It will be noted that the rubber 36 entirely surrounds the ring and is positioned between the ring and the walls of the hollow portion 32 of the pulley wheel 13. A plate 38 closes the hollow portion and is secured by means of the machine screws 40 to the wheel. The plate forms an air and a water tight inclosure.

From an examination of Figures 2 and 3, it will be noted that the mass 34 is confined or floats in a mass or sea of rubber and the dampening effect is obtained by the internal friction in the rubber. The rubber will tend to adhere to the pulley and to the dampening mass 34 at the surfaces of contact but will stretch or give in between. The rotation of the crankshaft will rotate the pulley 14 and the mass 34 and as the crankshaft decreases in speed, the inertia of the ring 34 will tend to keep it rotating at the higher speeds. This differential in the rotational speed between the ring 34 and the pulley 14 will produce the dampening effect, the rotation of the ring 34 being, of course, resisted by the internal friction in the rubber.

Figure 4:
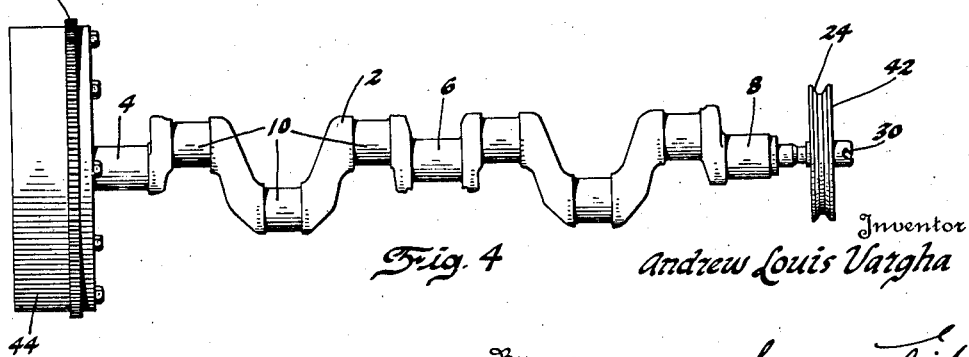
Figure 4 is a view similar to Figure 1 but showing the balancer applied to the flywheel.

Figure 4 shows the ordinary type of pulley wheel 42 without a dampener. The flywheel 44 is specially constructed to include the dampener. The particular structure of the dampener 44 is shown in Figures 5 and 6.

The flywheel 44 is hollow as indicated at 46 and receives therein the two-part annular channeled rubber mass 48 comprising the two symmetrical portions 50 and 52. Between the portions 50 and 52, there is confined the dampening mass or ring 54. Each rubber section 50 or 52 has the projecting or stud portions 56 which fit into corresponding recesses 58 in the flywheel housing 44 or in the cover plate 60, secured to the flywheel by means of the machine bolts 62.

At spaced intervals, the ring 54 is provided with openings 63 in which there are received the projecting portions 64 and 66 from the sections 50 and 52, respectively. One of the purposes of the projections 64 and 66 is to secure a better connection between the ring and the rubber.

The flywheel has the axial recess 68 and the axial opening 70 in which the end of the crankshaft 2 is received. The flywheel is also recessed as at 72 and the closure plate 60 has a corresponding opening 74 to form a recess for the reception of the flange of the crankshaft. The flange of the crankshaft is attached by means of bolts which pass through the opening 76 in the flywheel. The usual ring gear 78 is secured in a groove between the closure plate 60 and the flywheel 44 and is used in connection with the conventional starter mechanism.

Instead of being molded in two sections 50 and 52 the rubber mass 48 may be vulcanized to both flywheel and dampening ring 54.

The operation of the structure of Figures 4, 5 and 6 is the same as that of Figures 1, 2 and 3.

Figure 7 shows the conventional flywheel 12 and the conventional belt pulley 42, neither having a dampening means applied thereto. In the structure of Figure 7, the dampening member is applied to a cheek of one of the throws of the crankshaft. This is best shown in Figure 8.

The crankshaft may have the integral extension 82 the end of which is cylindrical in shape as shown in Figure 7 although it may be of any suitable form. The cylinder is hollow as indicated at 84 and in the hollow portion there is received the dampening mass or weight 86 and the rubber dampening mass 88 which completely surrounds and fills the space between the weight 86 and the interior walls of the hollow portion 84. A screw cap 90 closes the end of the hollow portion.

As in the case of the structure in the preceding figures, the dampening weight 86 floats in a mass or sea of rubber 88 and it is the internal friction in the rubber tending to harmonize the movement of the dampening member 86 with the arm 82 which produces the dampening or balancing effect. The rotation of the crankshaft will cause the arm 88 and all parts of the dampener connected thereto to rotate with the shaft. The mass 86 will tend to lag behind when the speed is increasing. When the speed is decreasing, the inertia of the weight 86 will tend to continue it at its higher rate of speed. The inharmonic motion of the weight 86 for the increasing and decreasing speeds will be counteracted by the friction in the rubber 88 which will produce the dampening effect.

Figure 9 shows a modification of the structure of Figure 8. Instead of the screw cap 90, a thin metal plate 92 is forced into the end opening 96 and held by shoulders 98. The rubber 88 is preferably vulcanized in position and to aid in accomplishing the vulcanizing operation, small blocks or plugs of rubber 100 are placed between the weight 86 and the hollow portion 84 to hold the weight in place during the vulcanizing operation.

Figure 10 is a view similar to Figure 2 but showing the manner in which the weight 34 is held in place during the vulcanizing operation. Blocks or plugs of rubber 100 are placed between the interior walls of the hollow portion 32 of the pulley wheel 14 to hold the mass 34 in place.

I claim:

1. In a vibration dampener for crankshafts, a hollow body rigidly secured to the shaft, a single metallic mass in the hollow body, and an elastic medium completely filling the space in the body between the walls thereof and the metallic mass.

2. In a vibration dampener for crankshafts, a hollow body rigidly secured to the shaft, a metallic ring in the hollow body, and a rubber filler between the walls of the hollow body and the ring.

3. In a vibration dampener for crankshafts, a hollow body rigidly secured to the shaft, a single metallic mass in the hollow body, said mass spaced from the walls of the body and the crankshaft, and an elastic medium filling the space in the body between the walls thereof and the metallic mass, and between the crankshaft and the metallic mass.

4. In a vibration dampener for crankshafts, a hollow body rigidly secured to the shaft, a single metallic mass in the hollow body, and a sectional elastic medium filling the space in the body between the walls thereof and the metallic mass.

5. In a vibration dampener for crankshafts, a hollow body rigidly secured to the shaft, a metallic ring in the hollow body, and a rubber filler between the walls of the hollow body and the ring, said rubber vulcanized to the body and the ring.

6. In a vibration dampener for crankshafts, a hollow body rigidly secured to the shaft, a metallic ring in the hollow body, a rubber filler between the walls of the hollow body and the ring, and means to support the ring in the body during the vulcanizing operation.

ANDREW LOUIS VARGHA.